(No Model.) 2 Sheets—Sheet 1.

S. W. HARMAN.
DISH CLEANER.

No. 495,329. Patented Apr. 11, 1893.

Witnesses
Severance.
Frank B. Severance.

Inventor
Samuel W. Harman,
By J. B. Lawyer
Attorney (No Model.) 2 Sheets—Sheet 2.

S. W. HARMAN.
DISH CLEANER.

No. 495,329. Patented Apr. 11, 1893.

Witnesses
Inventor
Samuel W. Harman,
By J. B. Sawyer,
Attorney

UNITED STATES PATENT OFFICE.

SAMUEL W. HARMAN, OF ROGERS, ARKANSAS.

DISH-CLEANER.

SPECIFICATION forming part of Letters Patent No. 495,329, dated April 11, 1893.

Application filed November 2, 1892. Serial No. 450,710. (No model.)

*To all whom it may concern:*

Be it known that I, SAMUEL W. HARMAN, a citizen of the United States, residing at Rogers, in the county of Benton and State of Arkansas, have invented certain new and useful Improvements in Washing-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain new and useful improvements in washing machines, whereby the machine is not only adapted to washing dishes and other articles that may be placed therein, but is adapted to be used to wash larger articles, such as windows and carriages, by means of a spray of water thrown thereon by a pump which forms a part of this invention, and for these purposes it consists in the construction, arrangement and combination of the several parts of which it is composed, as will be hereinafter more fully described and claimed.

Figure 1:
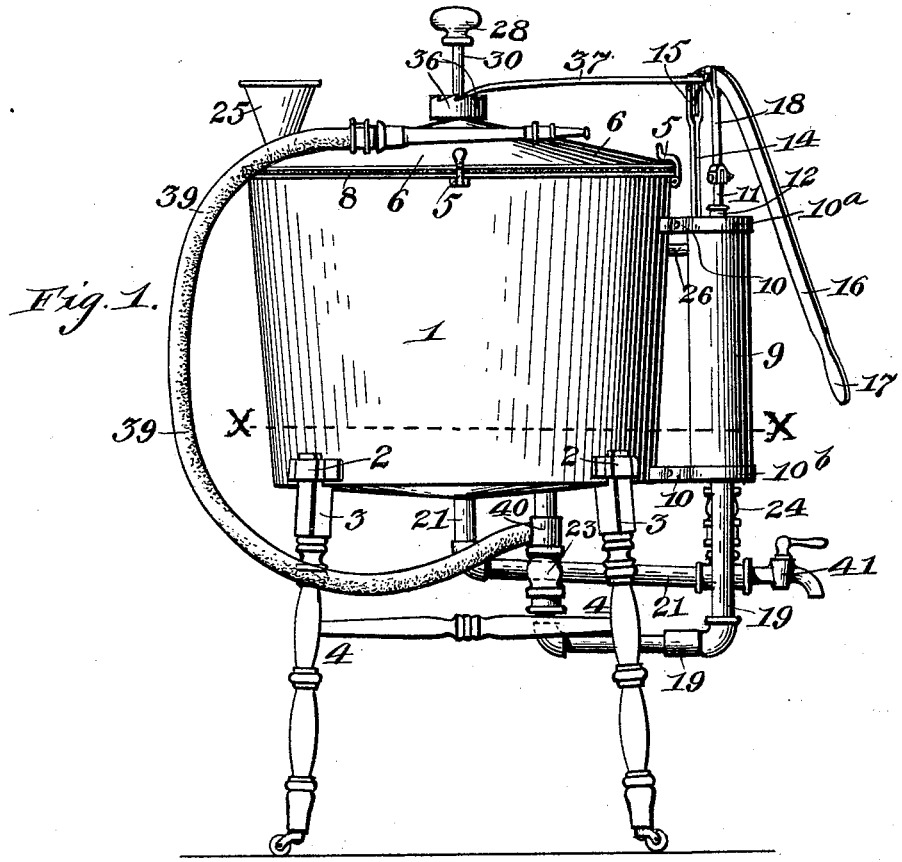
Figure 2:
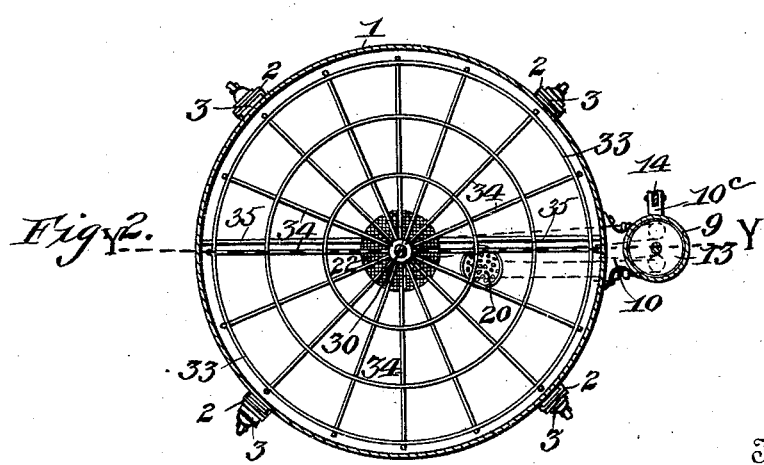
Figure 3:
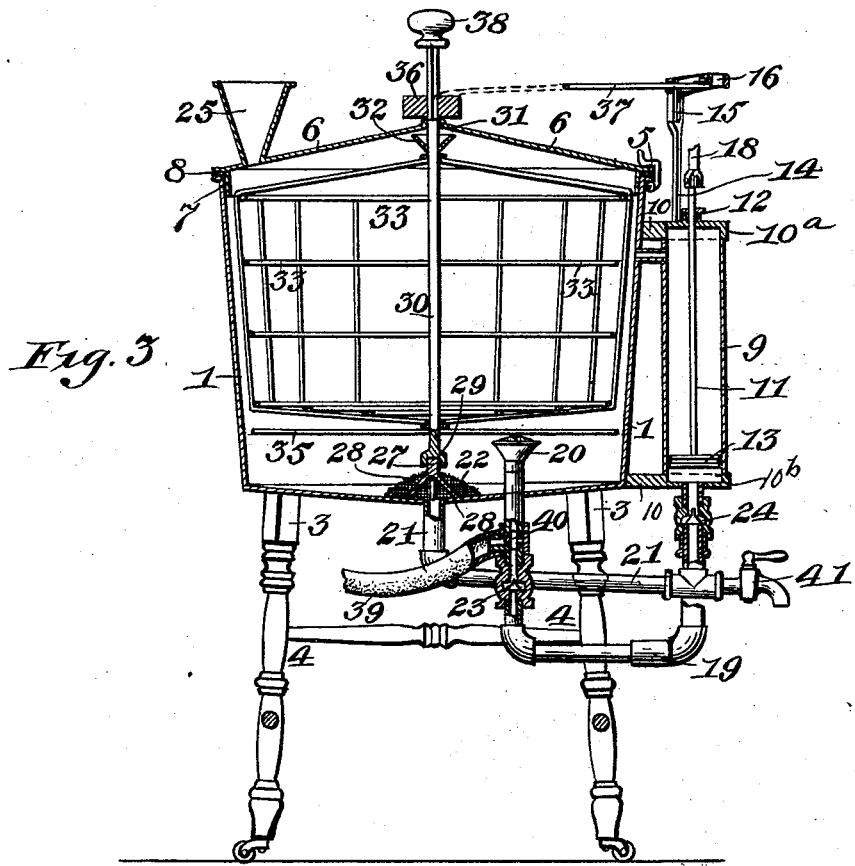
Figure 4:
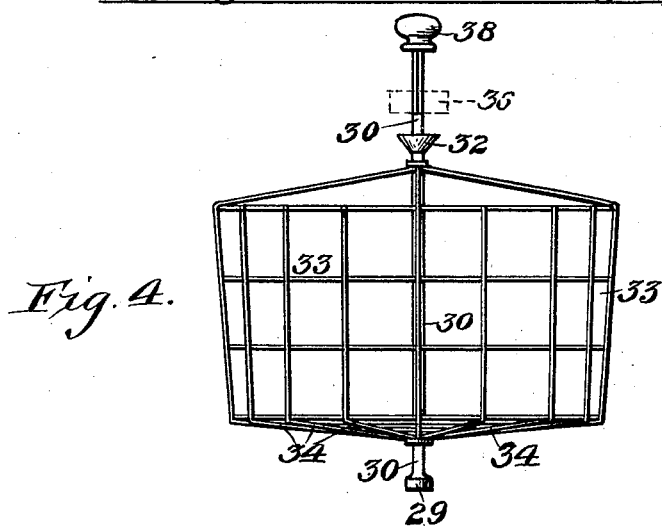

Referring to the accompanying drawings in which corresponding parts are designated by similar marks of reference, Figure 1 is a side elevation of my invention. Fig. 2 is a horizontal section on line X X of Fig. 1. Fig. 3 is a vertical longitudinal section on line Y Y of Fig. 2. Fig. 4 is a detailed view of the dish-holder or wire frame work removed from the exterior containing vessel.

The exterior containing vessel 1 may be of any approved construction and shape and is provided at several points around the periphery of its base with a series of sockets 2 which are adapted to receive the tops of the legs or standards 3 of the suitable supporting frame 4, by which the washer is held at a convenient height. Around the upper periphery of the containing vessel 1, clamps 5 are placed at suitable points to engage the rim of the cover 6 thereof, the said cover being provided with a downwardly projecting flange 7 which fits inside the top of the vessel 1, and in connection with the clamps 5 make a water tight joint at that point, but if desired an annular packing ring 8 of suitable material may be placed between the top of the vessel 1 and the rim of the cover to make the joint tighter as shown.

A cylinder 9 is supported on the outside of the containing vessel 1 by the brackets 10 secured to the sides of the said vessel 1 and forming a part of the upper and lower heads $10^a$ and $10^b$ of the cylinder. A piston rod 11 passes through a suitable packing box 12 on the head of the cylinder 9 and carries on its lower end the plunger head 13. An arm 14 has its one end secured to an ear $10^c$ on one side of the lower head $10^b$ of the cylinder 9, the opposite end of the said arm projecting upwardly and being bifurcated as at 15, to receive one end of the lever 16, which is pivoted thereto. The lever 16 has pivoted to it at a point between its pivoted point and its handle 17, the upper bifurcated end of a rod 18, the lower end of the said rod being also bifurcated and being pivoted to the upper end of the piston or lever, whereby upon moving the lever 16 the piston 11 will be caused to reciprocate vertically, it being guided by the plunger head 13 and the packing box 12. A pipe 19 leads from the bottom of the cylinder 9 into the bottom of the containing vessel, the said pipe 19 terminating within the latter in a suitable nozzle 20 raised slightly above the bottom of the containing vessel, which is in the form of an inverted cone, and hereinafter I will refer to the said pipe 19 as the induction pipe. A second pipe 21 leads from the bottom of the cylinder 9 and enters the bottom of the vessel 1 at its lowest point, the end of the said pipe 21 being flushed with the bottom of the vessel and being protected by a perforated screen 22 placed at a slight distance above it, and hereinafter I will refer to the said pipe 21 as the eduction pipe. A suitable upwardly opening valve 23 is placed in the vertical part of the pipe 19 near its discharging end, while a corresponding valve 24 is placed in the vertical portion of the pipe 21 at its discharging end, and it will be seen that by this construction upon raising the plunger 13 water will be drawn from the containing vessel 1 (into which it has been introduced through a funnel 25 on its cover 6) and after traversing the eduction pipe 21 (the valve 24 of which it will open in its passage)

will enter the cylinder 9, while upon a downward stroke of the plunger the water which has thus entered the cylinder will be forced through the induction pipe 19 (valve 23 of which it will open in its passage) and will flow out of the nozzle 20 with great force, filling the interior of the containing vessel 1 with a spray, which will strike against and wash the articles contained in the upper part thereof, as will be hereinafter more fully described. As great difficulty would be experienced in making the plunger head get water-tight into the cylinder 9 without undue friction, a small pipe 26 communicates between the interior of the vessel 1 and the interior of the cylinder 9, it entering the latter on a level with the top of the plunger head, when the latter is in its highest position, and it will be thus seen that any water working its way above the level of the plunger head will be lifted by it and will flow out of the cylinder through the said last named pipe.

A stud 27 is supported from the center of the bottom of the vessel 1 by means of forked legs 28 (which permit the out-flowing water to enter the pipe 21) and passes through the screen 22, the upper part of the stud 27 serving as a bearing for a recess 29 in the base of the upright central shaft 30, which passes through a suitable aperture 31 in the center of the cover 6, the said shaft having a deflecting disk 32 immediately below the central aperture 31 in the cover, thus preventing the spray produced within the vessel from escaping between the edges of the said aperture and the central shaft. A basket or crate 33 of approximately the same shape as the vessel 1 is rigidly secured upon the shaft 30, it being contained when the shaft is in position, entirely within the vessel. This crate is by preference made of wire, it having a bottom formed of radial wires 34, on which the plates and dishes may rest on edge, while when the crate is removed articles inserted in the vessel are supported by a cross rod 35 projecting across the lower part of the interior of the vessel 1. That portion of the vertical shaft 30 that projects above the top of the cover 6 is squared and receives a crown ratchet wheel 36, the several teeth of which are adapted to be successively engaged by the tipping dog 37, which is pivoted to the lever 16 between its pivotal point and the rod 18.

From the above construction it will be observed that having introduced the dishes or other articles to be washed into the crate 33, and having clamped on the cover 6, water may be introduced in the proper quantity into the vessel 1 through the funnel 25. If now the plunger 13 be reciprocated within the cylinder 9 by means of an up and down motion of the lever 16, each upward motion of the handle 17 of the latter will draw a certain quantity of water from the interior of the vessel 1, while each downward motion thereof will cause the same water to flow back into the vessel through the induction pipe 19 and nozzle 20, out of which latter it will pass in the form of a spray. Each downward motion of the handle 17 will, also, cause the dog 37 to move the crown ratchet wheel 36 forward a distance equal to the difference of the distances between the end of the dog and its pivotal point, when the lever 17 is raised, and between the position of the end of the said dog when the handle 17 is raised and its pivotal point when the handle 17 is lowered, while an upward motion of the said handle will restore the end of the dog to its first position, when the operation will be repeated upon the downward movement of the handle. The successive movements of the ratchet wheel 36 will impart a corresponding intermittent rotation to the shaft 30 and to the crate carried thereby, whereby the contents of the crate will be successively brought directly over the nozzle 21, in order that all parts may be thoroughly washed.

As in some cases it may be desired to turn the crate by hand, as when it is desired to wash the contents of one side of the crate more than the contents of another, I provide a detachable handle 38, which is adapted to be placed upon the top of the central shaft 30, when by throwing the dog 37 out of engagement with the ratchet 36, or by removing the latter from the shaft, the shaft will be free to turn by hand as may be desired.

In order to wash windows, carriages, &c., and other articles that are too large to be inserted in the vessel 1, I connect with the induction pipe 19 between the valve 23 therein and the vessel 1, a flexible hose 39 by which the water may be led to any desired point, fresh water being, of course, fed into the vessel 1 as fast as removed therefrom by the pump, formed by the cylinder 9 and plunger head 13. In order to direct the flow of water into the vessel 1, or to the hose 39 as may be desired, I place at the junction of the pipe 19 and the flexible hose a three way cock 40 of the well known usual construction.

In order to remove the liquid contents of vessel 1, when desired, I insert at the lowest point of eduction pipe 21 a faucet 41, by opening which the vessel may be drained.

Having thus described my invention, what I claim is—

1. In a washing machine, the combination with a containing vessel, of an exterior cylinder; induction and eduction pipes connecting the said vessel and cylinder; a revolving shaft contained within the said vessel and projecting from the top thereof; a crate mounted on the said shaft and contained within the said cylinder; a ratchet wheel mounted on the said shaft on the exterior of the said vessel; a plunger head and piston contained within the said cylinder; a pivoted lever actuating the said piston, and a dog pivoted to the said lever and engaging the said ratchet, substantially as described.

2. In a washing machine, the combination with a containing vessel and its cover, of an exterior cylinder; a plunger-head contained in the said cylinder, the said induction pipe entering the said vessel on one side of its center, and the said eduction pipe leaving the vessel at its center; a stud having forked legs supported within the vessel above the mouth of the said eduction pipe; a vertical shaft having its base resting on the said stud, and its upper end passing through the said cover, a crate and a deflecting button secured to the said shaft within the said cover, a lever for actuating the said plunger head, and a rotating mechanism for the said shaft actuated by the said handle, substantially as described.

3. In a washing machine, the combination with a containing vessel and its cover, of an exterior cylinder; a plunger-head contained in the said cylinder, the said induction pipe entering the said vessel on one side of its center, and the said eduction pipe leaving the vessel at its center; a stud having forked legs supported within the vessel above the mouth of the said eduction pipe; a vertical shaft having its base resting on the said stud, and its upper end passing through the said cover, a crate and a deflecting button secured to the said shaft within the said cover, a lever for actuating the said plunger head, a ratchet wheel removably mounted on the upper end of the said shaft above the said cover, and a dog pivoted to the said lever and engaging the said ratchet wheel, substantially as described.

In testimony whereof I affix my signature in presence of two witnesses.

SAMUEL W. HARMAN.

Witnesses:
W. A. MUNDELL,
J. J. BARNETT.